United States Patent
Centonza et al.

(10) Patent No.: US 11,412,470 B2
(45) Date of Patent: Aug. 9, 2022

(54) OPTIMIZED TIME SYNCHRONIZATION FOR A UE

(71) Applicant: Telefonaktiebolaget LM Ericsson (publ), Stockholm (SE)

(72) Inventors: Angelo Centonza, Stockholm (SE); Stefano Ruffini, Rome (IT); Joachim Sachs, Sollentuna (SE); Magnus Sandgren, Staffanstorp (SE); Mårten Wahlström, Hägersten (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/969,372

(22) PCT Filed: Feb. 15, 2019

(86) PCT No.: PCT/IB2019/051257
§ 371 (c)(1),
(2) Date: Aug. 12, 2020

(87) PCT Pub. No.: WO2019/159134
PCT Pub. Date: Aug. 22, 2019

(65) Prior Publication Data
US 2020/0404605 A1    Dec. 24, 2020

Related U.S. Application Data

(60) Provisional application No. 62/710,497, filed on Feb. 16, 2018.

(51) Int. Cl.
*H04J 3/06* (2006.01)
*H04W 56/00* (2009.01)

(52) U.S. Cl.
CPC ... *H04W 56/0015* (2013.01); *H04W 56/0065* (2013.01)

(58) Field of Classification Search
CPC .......... H04W 56/0015; H04W 56/003; H04W 56/0065
(Continued)

(56) References Cited

U.S. PATENT DOCUMENTS

| 2002/0129290 A1* | 9/2002 | Couillard | G06F 1/14 713/400 |
| 2010/0177600 A1 | 7/2010 | Brykowski et al. | |

(Continued)

FOREIGN PATENT DOCUMENTS

WO    2017 171621 A1    10/2017

OTHER PUBLICATIONS

3GPP TSG-RAN WG3 Meeting #89bis; Sofia Antipolis, France; Title: Solution Proposal for Network Based Synchronisation; Source: Ericsson (R3-152173)—Oct. 5-9, 2015.

(Continued)

*Primary Examiner* — Robert J Lopata
(74) *Attorney, Agent, or Firm* — Baker Botts, LLP

(57) ABSTRACT

According to certain embodiments, a method in a network node for delivering a time synchronization service comprises obtaining a timing accuracy threshold for a time synchronization service provided to a wireless device; determining, based on a first timing accuracy error at the network node and a second timing accuracy error between the network node and the wireless device, that a timing accuracy of the time synchronization service is equal or superior to the timing accuracy threshold, and transmitting the time synchronization service to the wireless device with a timing accuracy equal or superior to the timing accuracy threshold. The method further comprises, in response to determining that the timing accuracy of the time synchronization service (Continued)

is inferior to the timing accuracy threshold, reconfiguring the network node to improve the timing accuracy of the time synchronization service.

19 Claims, 9 Drawing Sheets

(58) Field of Classification Search
USPC .......................................................... 370/336
See application file for complete search history.

(56) References Cited

U.S. PATENT DOCUMENTS

| 2016/0087738 | A1 | 3/2016 | Jeon et al. | |
| 2016/0330709 | A1* | 11/2016 | Li | H04W 56/0025 |
| 2017/0289934 | A1* | 10/2017 | Sheng | G01S 19/14 |
| 2018/0132199 | A1* | 5/2018 | Zhang | H04W 56/0065 |
| 2019/0090262 | A1* | 3/2019 | Yan | H04W 72/042 |
| 2019/0190635 | A1* | 6/2019 | Goel | H04W 56/001 |
| 2019/0191403 | A1* | 6/2019 | Goel | H04L 27/2666 |
| 2019/0313356 | A1* | 10/2019 | Sandgren | H04L 27/2666 |
| 2019/0387486 | A1* | 12/2019 | Abedini | H04W 56/0045 |
| 2020/0107284 | A1* | 4/2020 | Nguyen | H04W 52/383 |
| 2020/0120625 | A1* | 4/2020 | Park | H04W 56/0025 |
| 2020/0169345 | A1* | 5/2020 | Andersson | H04J 3/0673 |
| 2020/0280943 | A1* | 9/2020 | Yu | H04W 56/0015 |
| 2021/0153151 | A1* | 5/2021 | Yin | G01S 19/256 |
| 2021/0219253 | A1* | 7/2021 | Van Phan | H04W 56/0055 |

OTHER PUBLICATIONS

PCT International Search Report for International application No. PCT/IB2019/051257—dated May 25, 2019.

PCT Written Opinion of the International Searching Authority for International application No. PCT/IB2019/051257—dated May 25, 2019.

* cited by examiner

OPTIMIZED TIME SYNCHRONIZATION FOR A UE

CROSS-REFERENCE TO RELATED APPLICATIONS

This application claims priority to U.S. Provisional Application Ser. No. 62/710,497 entitled "OPTIMIZED TIME SYNCHRONIZATION FOR A UE," filed Feb. 16, 2018, the content of which is incorporated herein by reference.

PRIORITY

This nonprovisional application is a U.S. National Stage Filing under 35 U.S.C. § 371 of International Patent Application Serial No. PCT/IB2019/051257 filed Feb. 15, 2019 and entitled "OPTIMIZED TIME SYNCHRONIZATION FOR A UE" which claims priority to U.S. Provisional Patent Application No. 62/710,497 filed Feb. 16, 2018 both of which are hereby incorporated by reference in their entirety.

TECHNICAL FIELD

Embodiments of the present disclosure are directed to wireless communications and, more particularly, to optimizing time synchronization services available to a user equipment (UE).

BACKGROUND

Third Generation Partnership Project (3GPP) fifth generation (5G) radio access network (RAN) architecture is described in 3GPP TS 38.401. An example is illustrated in FIG. 1.

FIG. 1 is a block diagram illustrating an overview of the next generation (NG) RAN architecture. The NG-RAN consists of a set of gNBs connected to the 5G core network (5GC) through the NG interface. A gNB can support frequency division duplex (FDD) mode, time division duplex (TDD) mode, or dual mode operation. Multiple gNBs can be interconnected through the Xn interface. A gNB may consist of a gNB central unit (CU) and gNB distributed units (DUs). A gNB-CU and a gNB-DU are connected via F1 logical interface. One gNB-DU is connected to only one gNB-CU.

NG, Xn and F1 are logical interfaces. For NG-RAN, the NG and Xn-C interfaces for a gNB consisting of a gNB-CU and gNB-DUs terminate in the gNB-CU. For evolved universal terrestrial radio access network (E-UTRAN) new radio dual connectivity (EN-DC), the S1-U and X2-C interfaces for a gNB consisting of a gNB-CU and gNB-DUs terminate in the gNB-CU. The gNB-CU and connected gNB-DUs are only visible to other gNBs and the 5GC as a gNB.

The NG-RAN is layered into a Radio Network Layer (RNL) and a Transport Network Layer (TNL). The NG-RAN architecture (i.e., the NG-RAN logical nodes and interfaces between them) is defined as part of the RNL. For each NG-RAN interface (NG, Xn, F1), the related TNL protocol and functionality are specified. The TNL provides services for user plane transport and signaling transport. In NG-Flex configuration, each gNB is connected to all access and mobility management functions (AMFs) within an AMF Region. The AMF Region is defined in 3GPP TS 23.501.

Some 3GPP services include time or phase synchronizing user equipment (UE) and devices from the cellular network. Support for some synchronization capabilities are included with a 3GPP feature referred to as high reliability long term evolution (LTE).

Different devices or applications can have different needs for accurate time or phase synchronization. The particular use case determines the needed accuracy and whether a phase or absolute time relation is needed. Some of the strictest services may include ~1 us target accuracy between applications and generally include industrial applications or smart grid devices, while general mobile broadband (MBB) services may have no synchronization requirements at all.

Particular eNB/gNBs may vary in their capability to deliver accurate timing information to a UE and further by the UE to the device. Strict base station timing can be costly, especially when combined with high availability. Also, only part of the total budget is within control of the base station. The main challenge with accurate time information is to distribute it with small additional errors. In every step in the distribution chain, the error increases and delays in the distribution must be compensated for.

FIG. 2 is a block diagram illustrating an example of the total timing error budget. The total timing error budget is a cumulation of the timing errors (Te) introduced at locations labelled 1-7 in FIG. 2. The timing error at location 1, referred to as $Te_{sync\ source}$, is the timing error introduced as the timing signal is transmitted from its origin, such as the illustrated satellite, to the satellite receiver or synchronization source. The timing error at location 2, referred to as $Te_{sync\ source\ 2\ xNB}$, is the timing error introduced in the transmission of the timing signal from the synchronization source to an eNB/gNB (also referred to generally as xNB). The timing error at location 3, referred to as $Te_{xNB}$, is the timing error at the antenna reference point (ARP) of the xNB. The timing error at location 4, referred to as $Te_{prop}$, is the timing error introduced in the transmission of the timing signal from the xNB to a user equipment (UE) (i.e., propagation error). The timing error at location 5, referred to as $Te_{UE}$, is the timing error introduced by the UE processing the timing signal. The timing error at location 6, referred to as $Te_{UE\ 2\ device}$, is the timing error introduced in the transmission of the timing signal from the UE to a connected device. The timing error at location 7, referred to as $Te_{timing}$, is the timing error introduced by the device processing the timing signal.

Each component illustrated in the chain of components providing the time synchronization service may be able to control a subset of the various Te. For example, the xNB cannot control the $Te_{sync\ source}$ or $Te_{sync\ source\ 2\ xNB}$ timing errors, but the xNB may be able to control or modify $Te_{xNB}$ and/or $Te_{prop}$.

FIG. 3 is a block diagram illustrating an example of local timing and absolute timing. The need for an absolute time reference, such as a global positioning system (GPS) time reference, depends on user scenarios.

A first scenario includes UE local timing (between applications to common UE "UE1"). The first scenario does not require accurate xNB absolute timing or propagation compensation to the UE (low $Te_{prop}$).

A second scenario includes base station local timing (between applications using different UEs "UE1" and "UE2" but connected to a same xNB1). The second scenario does not require accurate xNB timing but does need low $Te_{prop}$.

A third scenario includes base station area timing (between applications using different UEs such as "UE2" and "UE3" that are connected to different xNBs such as "xNB1" and "xNB2").

The third scenario needs both low xNB timing alignment error (TAE) (between xNB antenna reference points) and good $T_{\_prop}$ compensation. The xNBs may use a common timing source or a different one.

An xNB can provide timing information to the UE via System Information Block 16 (SIB-16), for example. But this is limited in precision (granularity) and does not account for propagation delays such as $Te_{prop}$. Because SIB-16 is broadcasted, it cannot differentiate and target different service needs and scenarios.

Part of the propagation delay can be estimated from the timing advance (TA). The accuracy, however, is not sufficient for strict timing needs (mainly because of the granularity of the information exchanged between the base station and UE).

The $Te_{UE}$ timing error budget described above may also include a cumulation of timing errors introduced at different processing points in the UE. The UE time stamp accuracy for a timing signal received from an xNB (i.e., time resolution of reference symbols) depends on reference signal bandwidth and signal-to-noise ratio (SNR), which introduces a UE time estimation error, referred to as $Te_{UE\_DL}$, as part of a complete UE budget $Te_{UE}$. $Te_{UE\_DL}$ may be represented by the following equation:

$$\sigma \propto \frac{1}{\sqrt{\text{Total } SNR \times BW}}$$

where, $\sigma$ is the UE time estimation error and BW is the reference signal bandwidth.

Some existing synchronization solutions generally focus on synchronization over the radio from xNB to xNB. One example is radio interference-based synchronization (RIBS) delay compensation through round-trip time (RTT) timestamping and corresponding information exchange.

In some examples, the propagation delay between a RIBS source and RIBS target can be estimated using a precision RTT observation. A high-accuracy RTT estimate can be obtained by observing a reference-signal (RS) transmitted from the source and received at the target, and vice versa. In one direction, the reference signal transmission occurs at a known egress time with respect to the source's clock received at a measured ingress time with respect to the target's clock. In the reverse direction, the reference signal transmission occurs at a known egress time with respect to the target's clock received at a measured ingress time with respect to the source's clock. The measurement observations may be done asynchronously and thus do not need to be strongly coupled.

In some examples, procedures described herein may be used for synchronization between two base stations, between two mobile devices (e.g., UEs), or between a base station and a mobile device (e.g., UE). In general, synchronization may be between two nodes, where a node can be a base station or a mobile device (e.g., UE).

Some examples include high accuracy round-trip delay (RTD) ranging in LTE. Some examples include determining a distance between base stations. Synchronization service may be provided by network listening. The relevant parameters allowing for enhanced performance are provided by a centralized entity that orchestrates the synchronization service. It also includes direct eNB to eNB information exchange.

Beamforming characteristics may be applied to the synchronization use case (NR lean concept with initialization procedures, etc.). The proposed architecture and methods facilitate receiving synchronization from another operator with guaranteed quality.

Some examples include synchronization for industrial automation. For example, RIBS may be used to deliver time information towards a UE with a typical budget. A UE implementation may provide further distribution locally to a device through precision time protocol (PTP).

Some examples include accurate over-the-air (OTA) synchronization. Some examples may exchange transmission point geo-location information as part of RIBS propagation delay compensation.

3GPP TR 36.898 includes studies and proposals for reducing xNB relative time alignment errors (TAE). Two of the proposals are as described above. Two are using exchange of UE TA between xNBs to improve their TAE estimate.

SUMMARY

Based on the description above, there currently exist certain challenges for providing timing synchronization. For example, individual user equipment (UEs) may depend on timing services provided by various network components and the timing relations between those components. The individual UE may desire a certain timing accuracy. Timing accuracy, however, may be dependent on xNB antenna reference point time accuracy (up to and including $Te_{xNB}$) and timing errors caused by: (a) propagation delay ($Te_{prop}$); (b) base station receiver timing error at the antenna reference point ($Te_{xNB}$); and (c) UE downlink receive time error and UE downlink to uplink error ($Te_{UE\_DL}$ and $Te_{UE\_DL2UL}$).

The factors impacting timing accuracy are related to properties of the connected UE and the link between the xNB and the UE. Because different UEs (or services) may have different accuracy requirements, a UE tailored approach is more beneficial compared to, for example, SIB 16 as a broadcast method.

Also, optimizations for individual UEs targeting higher timing accuracies give operators a possibility to charge extra for additional service accuracy and share cost for potential synchronization investments fairly among users in the network.

Time synchronization traceability (i.e., traceability to a standard time scale (e.g., International Atomic Time (TAI), Coordinated Universal Time (UTC), etc.) with proper precision in the information that is carried (e.g., via proper extension of bits in e.g. SIB or via a tailored channel) is different than time synchronization accuracy (i.e., time error with respect to the ideal time reference). The accuracy depends on the capability to control the source of timing error indicated above. Both aspects (precision and accuracy) need to be addressed.

Certain aspects of the present disclosure and their embodiments may provide solutions to these or other challenges. Particular embodiments include a lean method to individually, dependent on requested accuracy and timing relations, improve target accuracy and reliability of delivered timing information.

In particular embodiments, a base station estimates the timing accuracy at the UE caused by $Te_{xNB}$ and $Te_{prop}$ and determines if it is sufficient for the accuracy requested by the UE, $Te_{UE\_Req}$. If not, the base station initiates a timing accuracy improvement mechanism. For example, the timing accuracy improvement mechanism may include $T_{\_prop}$ compensation (reducing $Te_{prop}$), or the UE mobility is used to determine the frequency of the compensation scheme. In some embodiments, the base station also considers the timing error $Te_{UE}$ and the part related to the xNB connection (i.e., the $Te_{UE\_DL}$).

In some embodiments, the base station improves the $Te_{UE\_DL}$ by: (a) dedicated reference symbol patterns with higher periodicity; (b) wider bandwidth for the UE; (c) power boosting; and/or (d) higher precision beamforming.

According to some embodiments, a method in a network node for delivering a time synchronization service comprises obtaining a timing accuracy threshold for a time synchronization service provided to a wireless device; determining, based on a first timing accuracy error at the network node and a second timing accuracy error between the network node and the wireless device, that a timing accuracy of the time synchronization service is equal or superior to the timing accuracy threshold, and transmitting the time synchronization service to the wireless device with a timing accuracy equal or superior to the timing accuracy threshold. The method may further comprise, in response to determining that the timing accuracy of the time synchronization service is inferior to the timing accuracy threshold, reconfiguring the network node to improve the timing accuracy of the time synchronization service.

In particular embodiments, reconfiguring the network node comprises any one or more of the following: (a) configuring the network node to use beamforming towards the wireless device; (b) configuring the network node to increase the power for transmission to the wireless device; (c) configuring the network node to increase the bandwidth for transmission to the wireless device; (d) configuring the network node to send a timing advance (TA) value to the wireless device that is more accurate than a TA value previously used with the wireless device; (e) configuring the network node to estimate a round trip time (RTT) of a transmission with the wireless device based on a reference signal transmitted from the network node to the wireless device and from the wireless device to the network node; (f) configuring the network node to increase the periodicity of reference signals transmitted to the wireless device; and/or (g) configuring the network node to reduce interference from communication with other wireless devices.

In particular embodiments, the method further comprises, in response to determining that the timing accuracy of the time synchronization service is equal or superior to the timing accuracy threshold, reconfiguring the network node to conserve network resources while providing the time synchronization service to the wireless device with the timing accuracy equal or superior to the timing accuracy threshold. Reconfiguring the network node to conserve network resources may comprise one or more of: (a) configuring the network node not to use beamforming towards the wireless device; (b) configuring the network node to decrease the power for transmission to the wireless device; (c) configuring the network node to decrease the bandwidth for transmission to the wireless device; (d) configuring the network node to send a TA value to the wireless device with lower resolutions than a TA value previously used with the wireless device; (e) configuring the network node to decrease the periodicity of reference signals transmitted to the wireless device; and/or (f) configuring the network node to increase communications with other wireless devices.

In particular embodiments, the method further comprises a timing accuracy error of the wireless device in receiving the time synchronization service. Determining that the timing accuracy of the time synchronization service is equal or superior to the timing accuracy threshold is further based on the timing accuracy error of the wireless device.

In particular embodiments, the timing accuracy threshold includes timing traceability information and timing precision information for the time synchronization service.

In particular embodiments, obtaining the timing accuracy threshold comprises one or more of: (a) obtaining subscription information associated with the wireless device; (b) receiving signaling from the wireless device; and/or receiving signaling from a core network.

In particular embodiments, the method further comprises signaling the timing accuracy threshold to another network node.

According to some embodiments, a network node is operable to deliver a time synchronization service. The network node comprises processing circuitry operable to obtain a timing accuracy threshold for a time synchronization service provided to a wireless device and determine, based on a first timing accuracy error at the network node and a second timing accuracy error between the network node and the wireless device, that a timing accuracy of the time synchronization service is equal or superior to the timing accuracy threshold. In response to determining that the timing accuracy of the time synchronization service is equal or superior to the timing accuracy threshold, the network node transmits the time synchronization service to the wireless device with a timing accuracy equal or superior to the timing accuracy threshold. The processing circuitry is further configured to perform all the embodiments related to the method above.

According to some embodiments, a method for use in a wireless device for receiving a time synchronization service comprises: obtaining a timing accuracy threshold for a time synchronization service; transmitting the timing accuracy threshold to a network node; and receiving a time synchronization service with a timing accuracy equal or superior to the timing accuracy threshold.

In particular embodiments, the method further comprises determining a timing accuracy error of the wireless device in receiving the time synchronization service and transmitting the determined timing accuracy error of the wireless device to the network node. The method may further comprise receiving an indication from the network node that the network node can no longer provide the time synchronization service with a timing accuracy equal or superior to the timing accuracy threshold and performing a handover to a different network node.

In particular embodiments, the timing accuracy threshold includes timing traceability information and timing precision information for the time synchronization service.

According to some embodiments, a wireless device is operable to receive a time synchronization service. The wireless device comprises processing circuitry operable to: obtain a timing accuracy threshold for a time synchronization service; transmit the timing accuracy threshold to a network node; and receive a time synchronization service with a timing accuracy equal or superior to the timing accuracy threshold.

In particular embodiments, the processing circuitry is further operable to perform all the embodiments related to the method above.

Also disclosed is a computer program product comprising a non-transitory computer readable medium storing computer readable program code, the computer readable program code operable, when executed by processing circuitry to perform any of the methods performed by the network node described above.

Another computer program product comprises a non-transitory computer readable medium storing computer readable program code, the computer readable program code operable, when executed by processing circuitry to perform any of the methods performed by the wireless device described above.

Certain embodiments may provide one or more of the following technical advantages. Particular embodiments facilitate time information to be delivered with different levels of accuracy from a xNB to a UE based on actual needs. Thus, complex and resource demanding methods are tailored and only used when needed and determined efficient.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Particular embodiments are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

As used herein, the term xNB refers to a base station of a radio access network that is involved in the provisioning of tailored time synchronization according to particular embodiments. As a non-limiting example, such a base station may belong to the long term evolution (LTE) or fifth generation (5G) new radio (NR) radio access technology (RAT) (e.g., eNB, gNB, etc.).

A UE can request a time synchronization service from the network with a certain timing accuracy (i.e., equal or superior to a timing accuracy threshold). The request can be structured in different ways. For example, the request may be based on the UE subscription or the UE identity, or it can be expressed in a dedicated service request, for example, via non-access stratum (NAS) signaling or via radio resource control (RRC) signaling.

Figure 1:
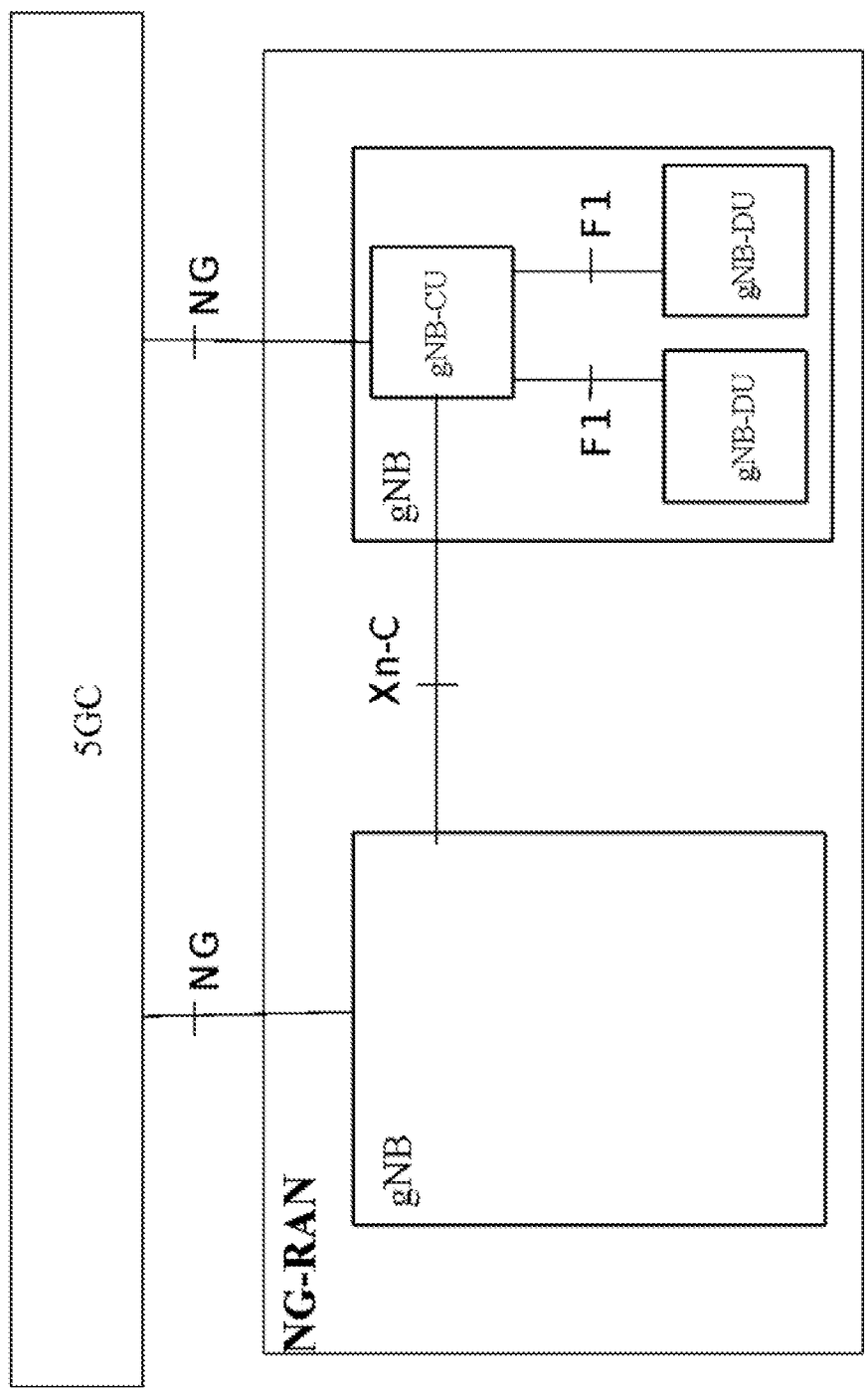
FIG. 1 is a block diagram illustrating an overview of the next generation (NG) RAN architecture.
Figure 2:
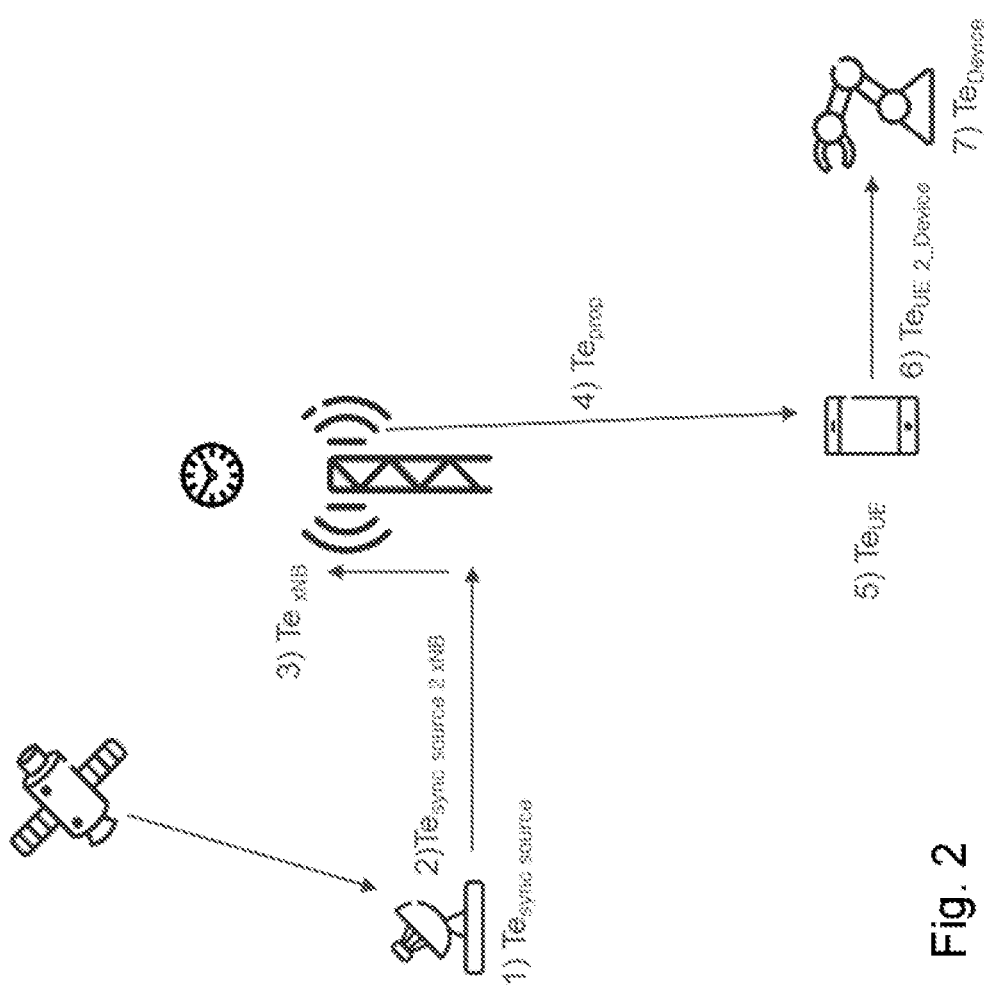
FIG. 2 is a block diagram illustrating an example of the total error budget.
Figure 3:
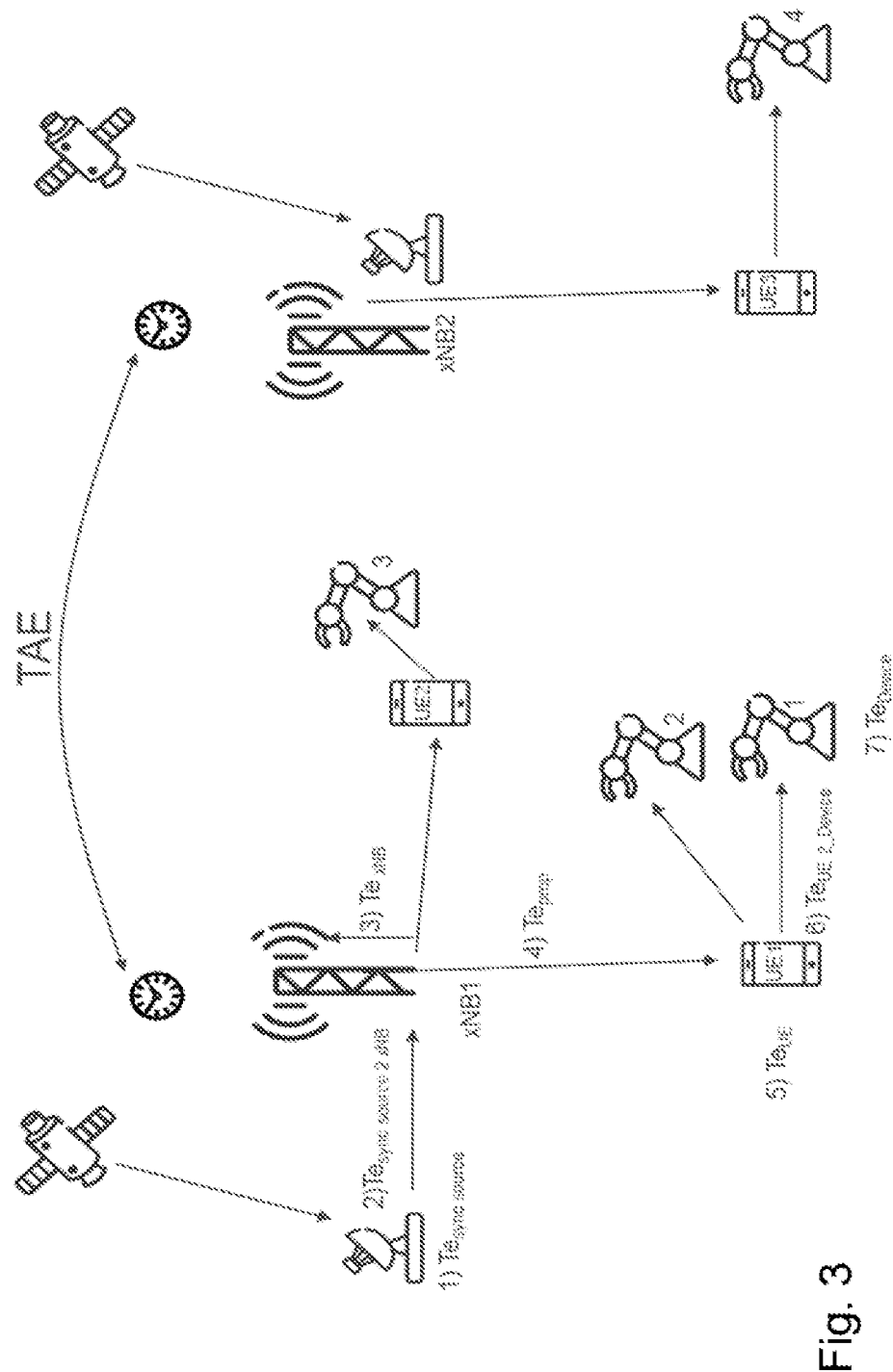
FIG. 3 is a block diagram illustrating an example of local timing and absolute timing.

If needed, an xNB can provide, through various methods, an estimate of the propagation time ($T_{prop}$) and corresponding error in timing accuracy ($Te_{prop}$). The xNB can also estimate the timing accuracy of its own input time reference and the estimated error at the antenna reference point ($Te_{xNB}$). Referring back to FIG. 2, the timing error at location 5, referred to as $Te_{UE}$, includes two subsets—the UE downlink receive time error ($Te_{UE\_DL}$) and the UE downlink to uplink error ($Te_{UE\_DL2UL}$). The two subsets depend on the UE capability and the link connection between the xNB and the UE.

The $Te_{xNB}$ can be referenced to as a common absolute time, like GPS time, or relative time (e.g., between xNB frame timings) depending on UE relations and the particular use case.

In particular embodiments, a base station estimates the timing accuracy at the UE based on $Te_{xNB}$ and $Te_{prop}$ and determines if it is sufficient for the accuracy requested by the UE, $Te_{UE\_Req}$ (also referred to as the timing accuracy threshold). If not, the base station initiates a timing accuracy improvement mechanism. The timing improvement mechanism may comprise the base station (e.g., xNB) reconfiguring itself to improve the timing accuracy of the time synchronization service. For example, the timing accuracy improvement mechanism may include $T_{prop}$ compensation (reducing $Te_{prop}$), or the UE mobility is used to determine the frequency of the compensation scheme. In some embodiments, the base station also considers the timing error $Te_{UE}$ and the error related to the xNB connection (i.e., the $Te_{UE\_DL}$).

In some embodiments, the base station improves the $Te_{UE\_DL}$ by: (a) dedicated reference symbol patterns with higher periodicity; (b) wider bandwidth for the UE; (c) power boosting; and/or (d) higher precision beamforming.

A method in an xNB for providing a time synchronization service equal or superior to a timing accuracy threshold may include the following steps. In a first step, an xNB receives information on the type of time traceability and related precision (e.g., arbitrary time, as could be needed for local phase alignment relationship, GPS time, UTC) that is needed.

In a second step, the xNB receives information about UE requested accuracy at its antenna reference point, referred to as $Te_{UE\_Req}$. As described above, this depends on actual service and/or relations to other devices. $Te_{UE\_Req}$ may be a subset of the total allowed timing budget at the wireless device (or other device connected to the wireless device) carrying the service. The information may be signaled by the UE to the base station, or it may be signaled by other systems to the base station (e.g., from the core network to the base station). Some embodiments include signaling to the base station from the UE or other systems, over available interfaces, the synchronization accuracy requested by the UE.

If the requested maximum error at the UE ($Te_{UE\_Req}$) is larger than the error at the xNB ($Te_{xNB}$) but still needs further improvements, a timing accuracy improvement mechanism is started such as a method for reducing RF propagation delay errors $Te_{prop}$ and errors related to the UE receive time stamping, such as the UE downlink receive time error $Te_{UE\_DL}$.

Some embodiments may reduce $Te_{prop}$ based on existing TA procedures. For reducing the $Te_{prop}$ by using existing timing advance (TA) mechanism, reference is made to the error budgets in the UE received TA as illustrated in FIG. 4.

Figure 4:
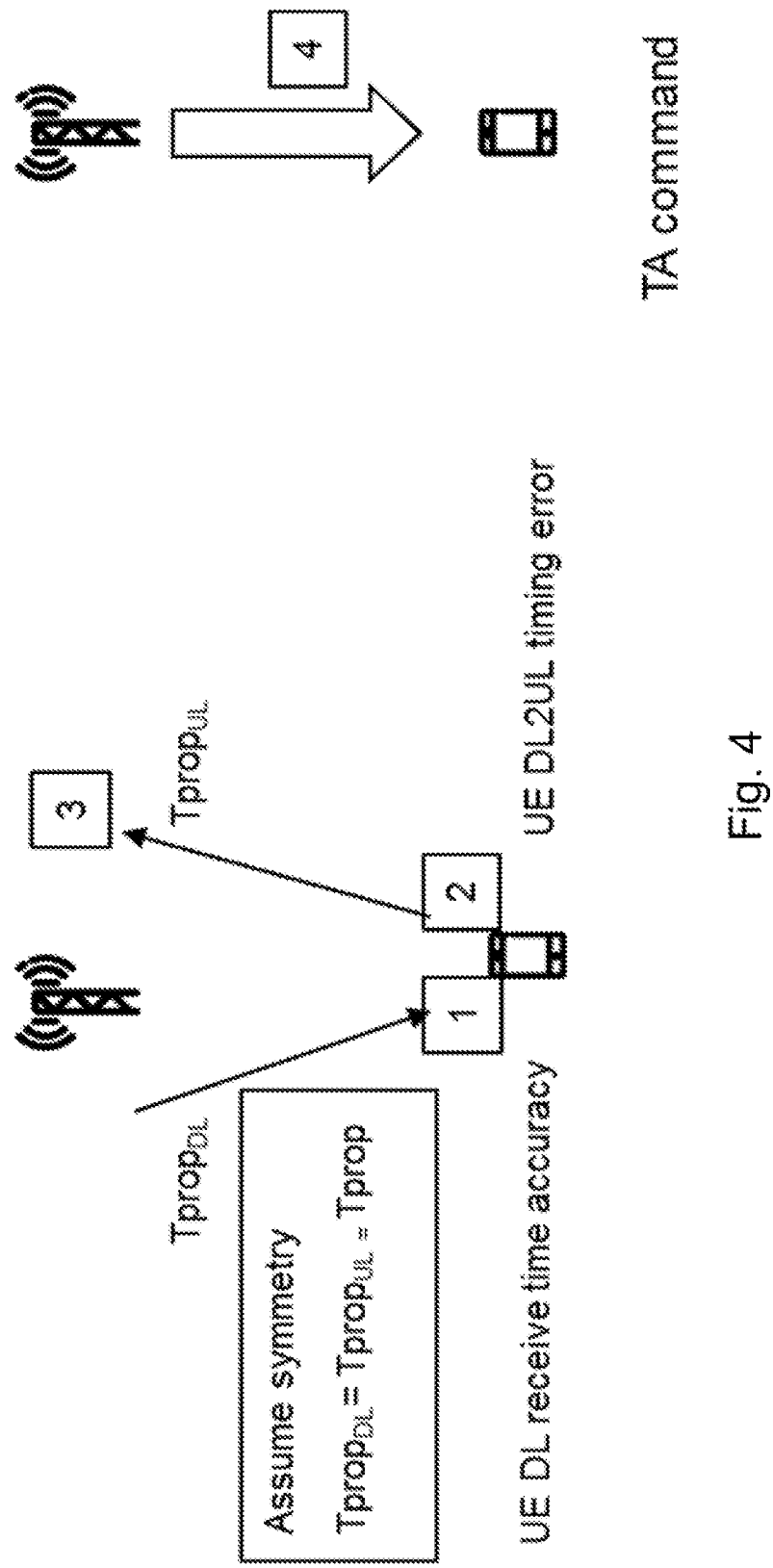
FIG. 4 is a block diagram illustrating an example of a UE timing advance budget.

FIG. 4 is a block diagram illustrating an example of a UE timing advance budget. Position 1 illustrates the UE downlink receive time stamp accuracy $Te_{UE\_DL}$. Position 2 illustrates the UE downlink to uplink time error $Te_{UE\_DL2UL}$ (Includes $Te_{UE\_DL}$). Position 3 illustrates xNB receive time stamp error $Te_{BSRX}$. Position 4 illustrates the xNB sending a TA command with a resolution error ($TA_{RES}$).

For 3GPP random access procedure, the initial random access is received 2 times $T_{\_prop}$ late at xNB with an error $Te_{UE\_DL2UL}+Te_{BSRX}$. The UE's one-way TA based $T_{\_prop}$ error is $Te_{prop}=(Te_{UE\_DL2UL}+Te_{BSRX}+TA_{RES})/2$.

If radio frequency propagation delay is determined based on existing 3GPP specifications, then using the propagation delay for delay compensation may result in the following error. Excluding asymmetry errors from LTE 3GPP 36.133 specification $Te_{prop}=(\pm24\ Ts\pm1\ Ts\pm8\ Ts)/2 \rightarrow \sim\pm0.54$ us (for 1.4 MHz bandwidth), with 1 Ts~32.55 ns. Because time stamp errors scale roughly inversely to the bandwidth, the error is less for LTE 3 MHz bandwidth.

Many NR systems using beamforming are expected to be TDD because of downlink and uplink reciprocity. This is also beneficial because it reduces asymmetry errors between uplink timings and downlink timings. The errors scale down with increased sub carrier spacing in NR 3GPP 38.133.

The error caused by the resolution in number of bits in the LTE TA command protocol (i.e., $TA_{RES}$) when sent to the UE can be reduced because this error is known by the xNB. A more accurate TA may be communicated to the UE through dedicated signaling.

The $Te_{UE\_DL2UL}$ may be improved by providing dedicated downlink reference signals with increased SNR and bandwidth just prior to the UE performing its uplink transmission (e.g., a new initial PRACH). The SNR at the UE may be improved by, for example, beamforming in the direction of the UE and dedicating all available power to the single UE (in a multi user MIMO system) and/or reducing interference from other layer transmissions. The remaining error depends on UE implementation and can be estimated by the UE itself and could be communicated to the xNB for knowledge (the xNB can also make an estimate based on UE assumptions).

The 3GPP specification generally accounts for worst-case implementation and worst-case conditions. In reality, especially if conditions like SNR can be improved, then the accuracy can be improved. For example, the $Te_{BSRX}$ is generally known with better accuracy than the worst-case value in the 3GPP specification and can be improved by beamforming in the direction of the UE, the direction being known from earlier connections (or further post processing of received data in optimal directions dependent of supported beamforming methods). A more accurate estimate of the error can be communicated to the UE, for example, together with the improved TA command above.

Multiple random-access attempts can be performed to reduce random errors by averaging. This would be suitable, for example, for stationary UEs with static radio frequency paths and propagation delays because initial overhead is not significant over time.

A second method, instead of improving the existing TA, is to use a more dedicated signaling and RTT measurements. An advantage of the second approach is that signaling is not bound to existing random access occasions and procedures.

A third approach is when a geo-position of the UE is known, then the exchange of geo-position data could be used to estimate the propagation delay (e.g., the xNB coordinates are generally known by the network). A disadvantage is that the radio frequency path might not be line-of-sight like the geo-coordinate data and the UE might lack good positioning.

Particular embodiments may minimize the $T_{\_prop}$ errors ($Te_{prop}$) caused by UE mobility. The xNB continuously tracks the UE uplink timing. The xNB may detect changes in UE uplink timing caused by UE mobility, and if needed because of strict timing requirements, dedicated signals with higher resolution could be sent to the UE to be used for more accurate $T_{\_prop}$ compensation of received timings.

Particular embodiments may reduce the UE downlink time stamp error ($Te_{UEDL}$). After the $Te_{prop}$ is reduced, the UE continuously tracks the timing of the xNB through its downlink transmission. If decided needed based on a UE requested maximum error ($Te_{UE\_Req}$), xNB antenna reference point error ($Te_{xNB}$) and the estimated remaining $Te_{prop}$, the downlink time stamping by the UE can be further improved in incremental approach using any of the following.

A first example includes transmission of downlink timing reference signals with higher bandwidth. A second example includes improving the SNR for the downlink timing reference signals to the specific UE. SNR improvement may be achieved by increasing the power to the specific UE, beam forming in a narrow direction of the UE and/or by reducing the interference e.g. only allowing a single transmission in a multi user MIMO system. Additional options include coordination between neighbor nodes to reduce interference.

A third example includes providing a higher periodicity of downlink signals which facilitates averaging out random time stamp errors at the UE receiver. A higher periodicity may also be used if requested by the UE to compensate for drift of its internal oscillators.

More resources of the xNB total capacity are dedicated to the embodiments described above. The network can balance the resources according to the actual needs. The UE might only need accurate time over a particular period of time. Through bi-directional signaling, the xNB and UE may start, stop and re-initiate the service based on demand.

Particular embodiments include change of xNB synchronization status and the estimated antenna reference point error ($Te_{xNB}$). Even if rare, the xNB may occasionally lose its synchronization source. If so, the xNB enters holdover mode and its timing relies on the stability of its internal oscillator or external frequency source (e.g., SyncE). If the xNB discovers it cannot meet UE timing requirements, then the xNB may inform the UE and the UE can act upon the information. The xNB may recommend handover to an alternative xNB with better timing.

Particular embodiments include exchange of timing and error compensation data. Different methods could be used to exchange timing and error compensation data.

The timing at the xNB antenna reference point is common towards UEs connected to the base station. This could be broadcasted or transmitted individually to UEs. The particular method used may differ depending on the needs of the device receiving the time synchronization service. As one example, user subscription information may be used to differentiate between different accuracy levels. Dedicated signaling also facilitates different precision levels (compared to broadcast signaling). A broadcast method could be complemented by a decoding method or additional high granularity bits signaled separately depending on the required accuracy.

The timing error and corresponding data for improving time synchronization service accuracy at the receiving UE is dependent on the characteristics of the specific connection between the xNB and the UE. Compensation for the timing error can be performed by the UE and/or the xNB after exchanging information about the desired timing accuracy threshold and other capabilities or limitations of the xNB and UE.

Particular embodiments include forwarding of synchronization accuracy information. When the base station serving a UE becomes aware of the synchronization requirements needed by a UE for a given service or for a given radio access communication, the base station may signal the information to other base stations involved in UE mobility. As a non-limiting example, the base station may signal over the Xn or X2 interface, as part of the handover preparation procedures, information relative to the synchronization accuracy needed by the UE. The information may, for example, be associated to a specific radio bearer or to a specific traffic flow (a Quality of Service (QoS) flow, as named in NR systems), or the information may be associated to the UE for all the services the UE is actively supporting. The information may also be signaled to the core network for storage as part of UE information that can either be used to provide the needed synchronization over different RAT nodes, or that can be retrieved at a later point in time when a UE context will need to be setup at a RAT base station.

Figure 5:
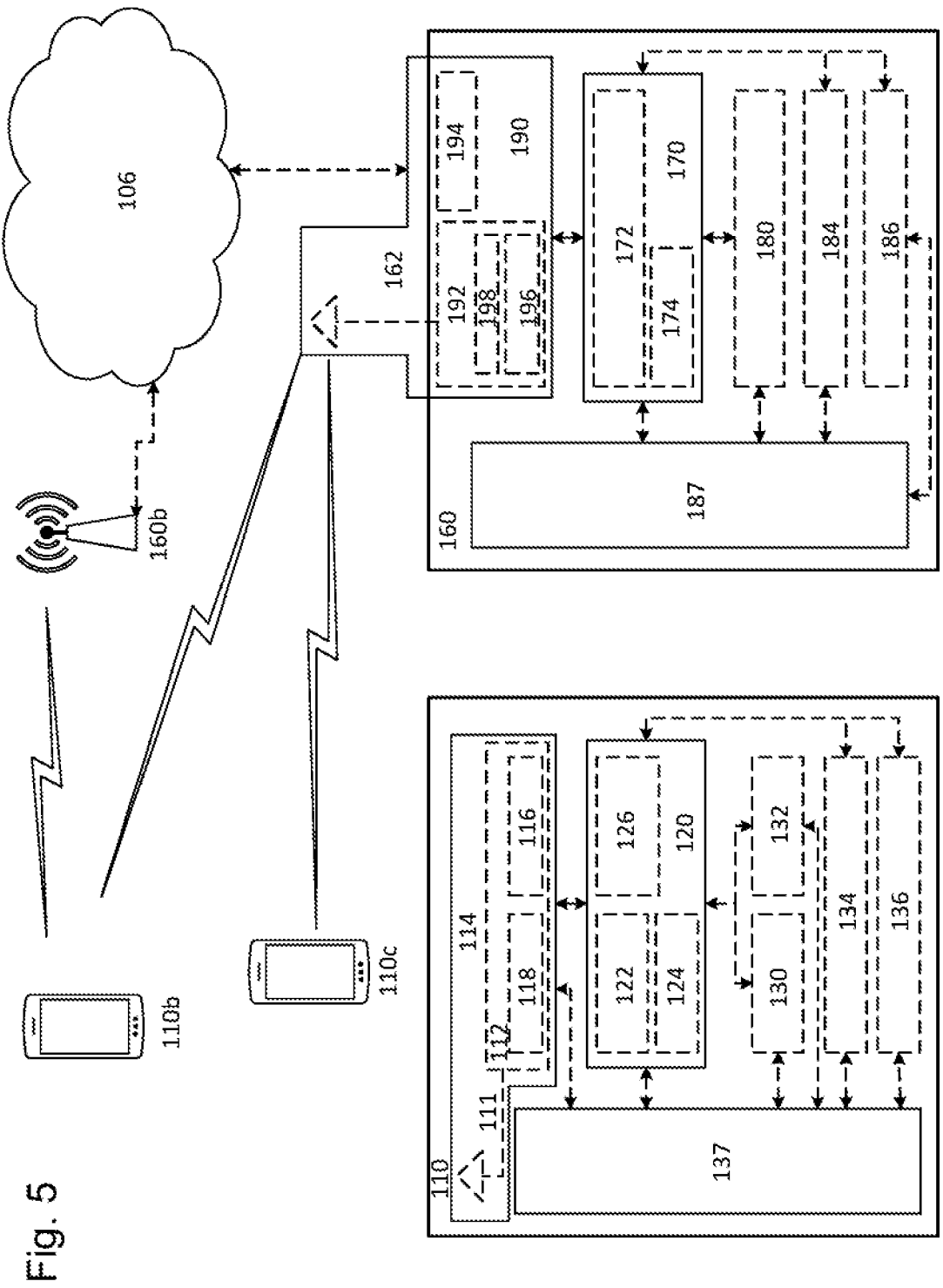
FIG. 5 is a block diagram illustrating an example wireless network.

FIG. 5 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 160 includes processing circuitry 170, device readable medium 180, interface 190, auxiliary equipment 184, power source 186, power circuitry 187, and antenna 162. Although network node 160 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and an RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. The operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 5 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g. RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The communication system 106 may itself be connected to a host computer (not shown), which may be embodied in the hardware and/or software of a standalone server, a cloud-implemented server, a distributed server or as processing resources in a server farm. The host computer may be under the ownership or control of a service provider or may be operated by the service provider or on behalf of the service provider.

The communication system of FIG. 5 as a whole enables connectivity between one of the connected WDs 110 and the host computer. The connectivity may be described as an over-the-top (OTT) connection. The host computer and the connected WDs 110 are configured to communicate data and/or signaling via the OTT connection, using an access network, a core network, any intermediate network and possible further infrastructure (not shown) as intermediaries. The OTT connection may be transparent in the sense that at least some of the participating communication devices through which the OTT connection passes are unaware of routing of uplink and downlink communications.

The host computer may provide host applications which may be operable to provide a service to a remote user, such as a WD 110 connecting via an OTT connection terminating at the WD 110 and the host computer. In providing the service to the remote user, the host application may provide user data which is transmitted using the OTT connection. The "user data" may be data and information described herein as implementing the described functionality. In one embodiment, the host computer may be configured for providing control and functionality to a service provider and may be operated by the service provider or on behalf of the service provider. The host computer may be enabled to observe, monitor, control, transmit to and/or receive from the network node 160 and or the wireless device 110.

One or more of the various embodiments in this disclosure improve the performance of OTT services provided to the WD 110 using the OTT connection. More precisely, the teachings of some of these embodiments may improve the data rate, latency, and/or power consumption and thereby provide benefits such as reduced user waiting time, relaxed restriction on file size, better responsiveness, extended battery lifetime, etc.

Figure 6:
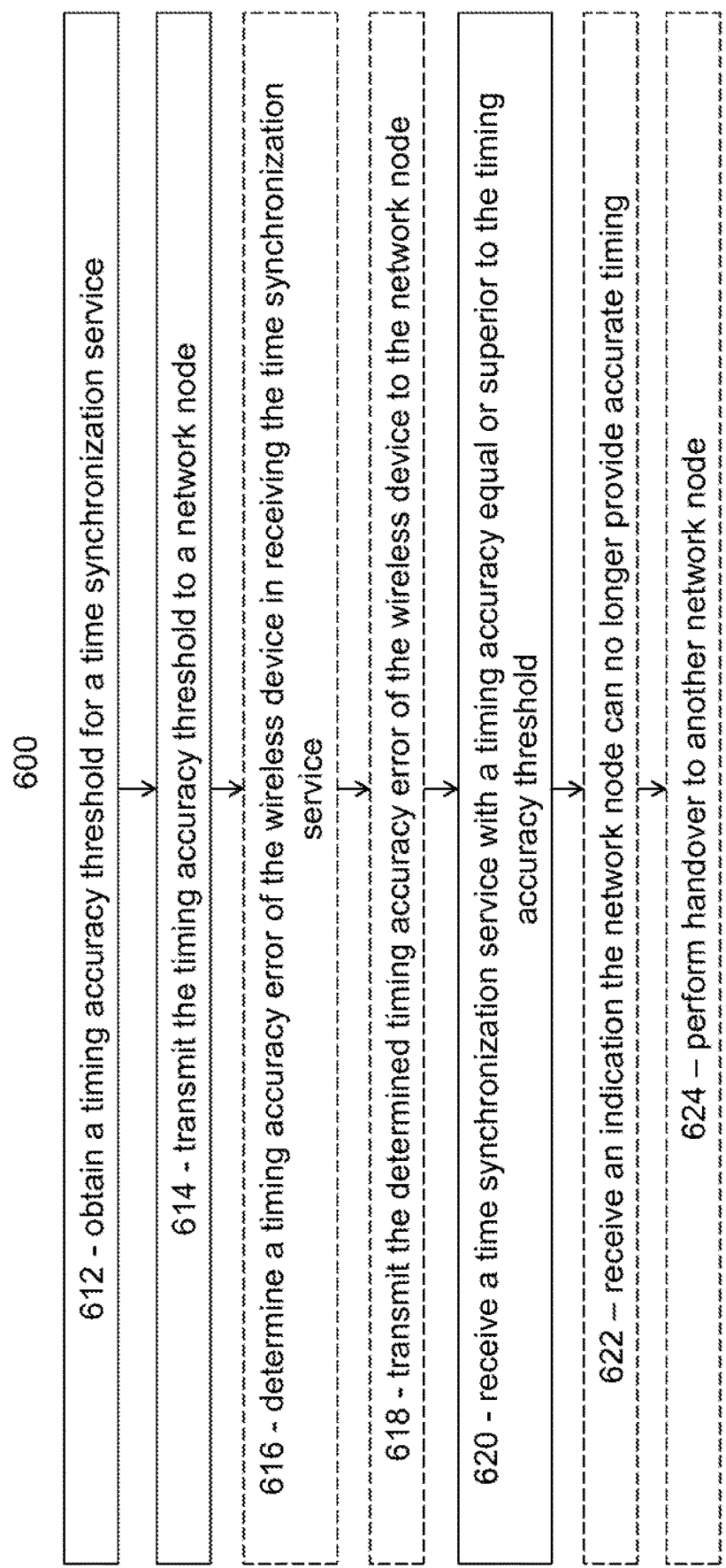
FIG. 6 is a flowchart illustrating an example method in a wireless device, according to certain embodiments.

FIG. 6 is a flowchart illustrating an example method in a wireless device, according to certain embodiments. In particular embodiments, one or more steps of FIG. 6 may be performed by wireless device 110 described with respect to FIG. 5.

The method may begin at step 612 where a wireless device (e.g., wireless device 110) obtains a timing accuracy threshold for a time synchronization service. The timing accuracy threshold may include timing traceability information and timing precision information for the time synchronization service.

Different wireless devices may have different needs for timing accuracy. Some wireless devices or applications may require a high threshold of accuracy, which may require more network resources than a lower threshold. Thus, providing a time synchronization service tailored to the specifics needs of the wireless device is an efficient use of network resources.

In some embodiments, the wireless device may be preconfigured with the timing accuracy threshold or may receive the timing accuracy threshold from a network node or core network via signaling. In some embodiments, the timing accuracy threshold may be based on the characteristics associated with a user subscription.

At step 614, the wireless device transmits the timing accuracy threshold to a network node (e.g., network node 160). The wireless device is indicating to the network node its desired level of accuracy.

In some embodiments, at step 616 the wireless device determines a timing accuracy error of the wireless device in receiving the time synchronization service, and at step 618 transmits the determined timing accuracy error of the wireless device to the network node. Each wireless device, based on its hardware components for example, may introduce a different amount of timing error when receiving the time synchronization service. By determining the amount of error and sending it to the network node, the network node can use the information to better determine how to provide the desired level of timing accuracy.

At step 620, the wireless device receives a time synchronization service with a timing accuracy equal or superior to the timing accuracy threshold. The network node is able to provide the time synchronization service because the wireless device previously indicated its desired level to timing accuracy to the network node.

In some embodiments, at step 622 the wireless device receives an indication from the network node that the network node can no longer provide the time synchronization service with a timing accuracy equal or superior to the timing accuracy threshold. For example, because of mobility of the wireless device, increased interference from other wireless devices, etc., the network node may no longer be able to provide the desired timing accuracy level.

The wireless device may determine whether it can continue with a reduced level of timing accuracy or whether another cell is available that can provide the desired level of timing accuracy. If another cell is available, at step 624 the wireless device may perform a handover to a network node in the other cell.

Modifications, additions, or omissions may be made to method 600 of FIG. 6. Additionally, one or more steps in the method of FIG. 6 may be performed in parallel or in any suitable order.

Figure 7:
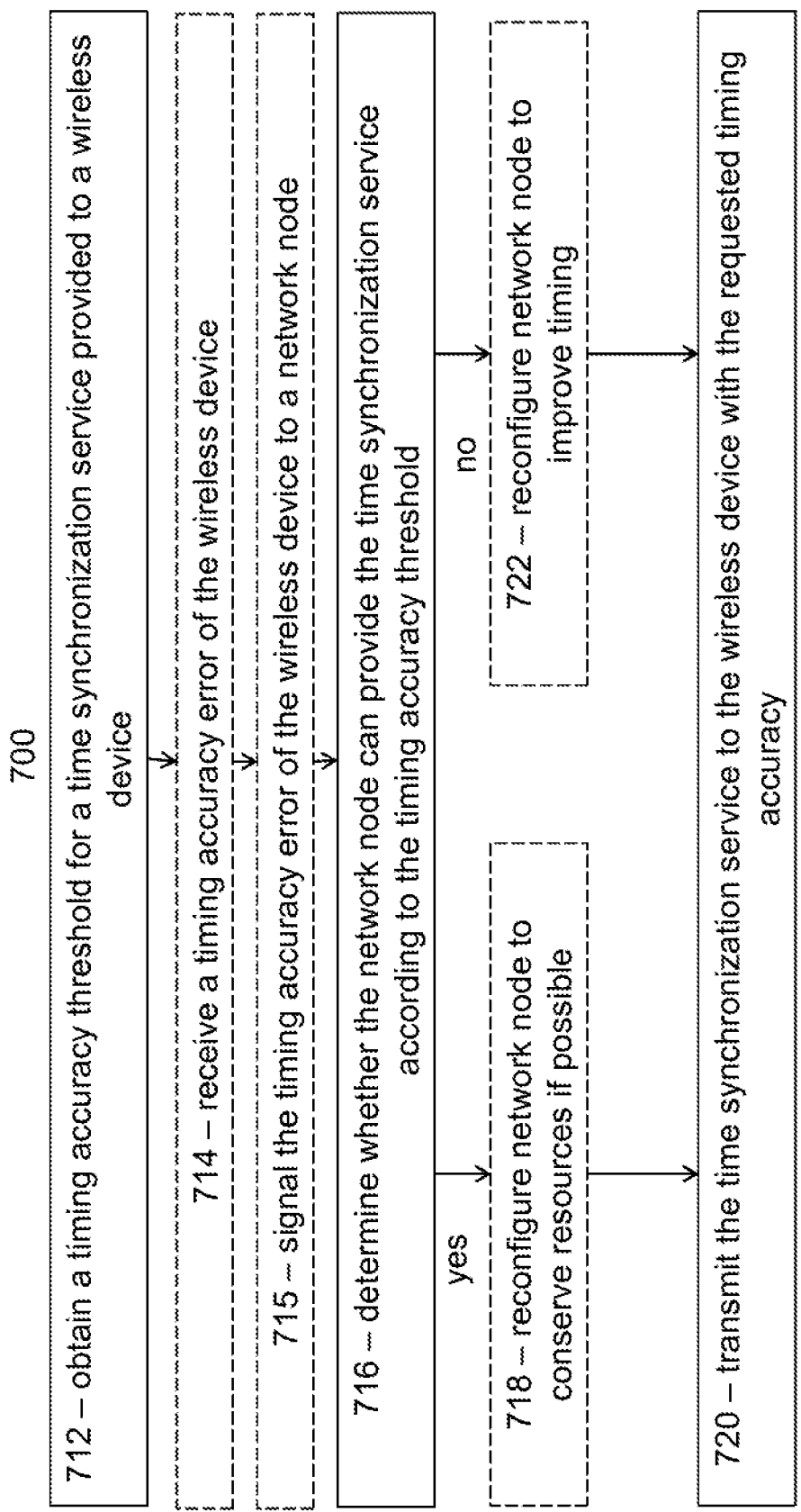
FIG. 7 is a flowchart illustrating an example method in a network node, according to certain embodiments.

FIG. 7 is a flowchart illustrating an example method 700 in a network node, according to certain embodiments. In particular embodiments, one or more steps of FIG. 7 may be performed by network node 160 described with respect to FIG. 5.

The method may begin at step 712 where a network node (e.g., network node 160) obtains a timing accuracy threshold for a time synchronization service provided to a wireless device (e.g. wireless device 110). In some embodiments, the network node may receive the timing accuracy threshold via signaling from the wireless device or signaling from another network node or core network node. In some embodiments, the timing accuracy threshold may be based on the type or category of wireless device or associated with a user subscription and located in a profile associated with the user obtained from a core network node.

Some embodiments include step 714, where the network node receives a timing accuracy error of the wireless device in receiving the time synchronization service. Different wireless devices may introduce different amounts of timing error and the network node may use this information later in step 716.

Some embodiments include step 715, where the network node signals the timing accuracy threshold to another network node. For example, the network node may signal the desired timing accuracy threshold to a core network node where it may be stored for use by other network nodes that may provide a time synchronization service to the wireless device.

At step 716, the network node determines whether it can provide the time synchronization service to the wireless device with a timing accuracy equal or superior to the timing accuracy threshold. The determination is based on a first timing accuracy error at the network node (e.g., $Te_{xNB}$) and a second timing accuracy error between the network node and the wireless device (e.g., $Te_{prop}$). In some embodiments, the determination may include the timing accuracy error of the wireless device (e.g., $Te_{UE}$) received at step 714.

If the network node is able to provide the time synchronization service with a timing accuracy equal or superior to the timing accuracy threshold, then the method may continue to step 718 in some embodiments.

At step 718, the wireless device may reconfigure the network node to conserve network resources while providing the time synchronization service to the wireless device with the timing accuracy equal or superior to the timing accuracy threshold. For example, the network node may have previously provided a time synchronization service to the wireless device at a first timing accuracy threshold. The currently requested timing accuracy threshold may be lower than the first timing accuracy threshold. Thus, the UE may be able to use less resources and still provide the desired timing accuracy.

Returning to step 716, if the network node is not able to provide the time synchronization service with a timing accuracy equal or superior to the timing accuracy threshold, then the method may continue to step 722 in some embodiments.

At step 722, the network node may reconfigure itself to improve the timing accuracy of the time synchronization service. For example, the network node may perform any one or more of the following: (a) configure the network node to use beamforming towards the wireless device; (b) configure the network node to increase the power for transmission to the wireless device; (c) configure the network node to increase the bandwidth for transmission to the wireless device; (d) configure the network node to send a timing advance (TA) value to the wireless device that is more accurate than a TA value previously used with the wireless device; (e) configure the network node to estimate a round trip time (RTT) of a transmission with the wireless device based on a reference signal transmitted from the network node to the wireless device and from the wireless device to the network node; (f) configure the network node to increase the periodicity of reference signals transmitted to the wireless device; and/or (g) configure the network node to reduce interference from communications with other wireless devices.

At step 720, the network node transmits the time synchronization service to the wireless device with the requested timing accuracy.

Modifications, additions, or omissions may be made to method 700 of FIG. 7. Additionally, one or more steps in the method of FIG. 7 may be performed in parallel or in any suitable order.

Figure 8:
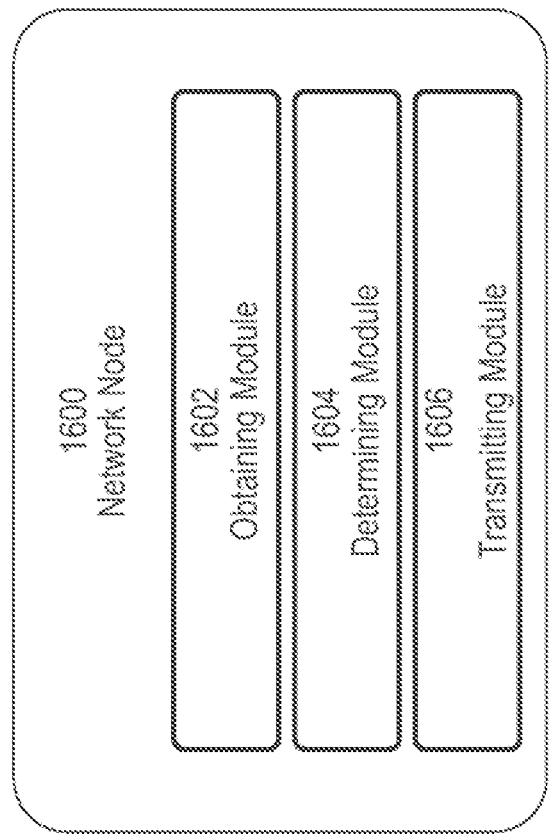
FIG. 8 illustrates an example wireless device and an example network node, according to certain embodiments.
Figure 8:
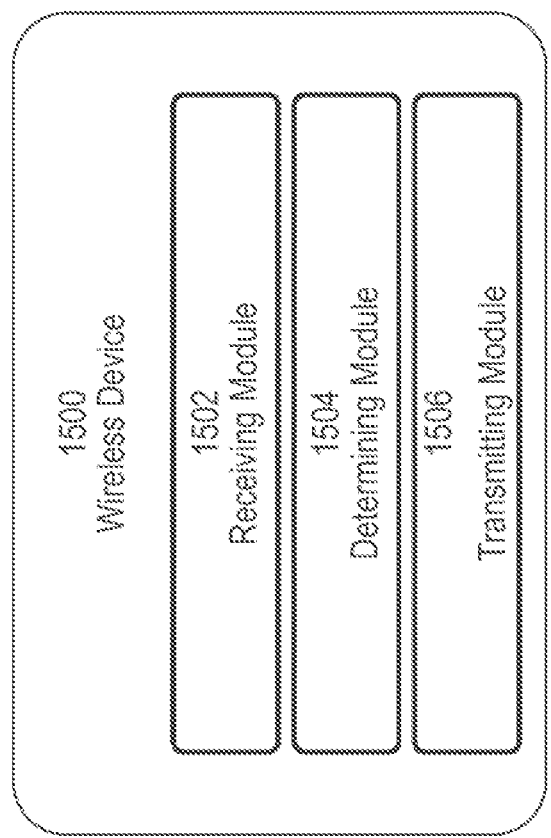

FIG. 8 illustrates an example wireless device and an example network node, according to certain embodiments. The network node 1600 and wireless device 1500 may comprise network node 160 and wireless device 110, respectively, illustrated in FIG. 5.

Network node 1600 is operable to carry out the example method described with reference to FIG. 7 and possibly any other processes or methods disclosed herein. It is also to be understood that the method of FIG. 7 is not necessarily carried out solely by apparatus 1600. At least some operations of the method can be performed by one or more other entities, including virtual apparatuses.

Network node 1600 may comprise processing circuitry such as 170 of FIG. 5. In some implementations, the processing circuitry may be used to cause obtaining module 1602, determining module 1604, transmitting module 1606, and any other suitable units of network node 1600 to perform corresponding functions according one or more embodiments of the present disclosure.

As illustrated in FIG. 8, network node 1600 includes obtaining module 1602, determining module 1604, and transmitting module 1606. In certain embodiments, obtaining module 1602 may obtain a timing accuracy threshold for a time synchronization service provided to a wireless device according to any of the embodiments and examples described above. Determining module 1604 may determine whether a timing accuracy of a time synchronization service is equal or superior to the timing accuracy threshold and potentially reconfigure the network node to provide the desired timing accuracy according to any of the embodiments and examples described herein. Transmitting nodule 1606 transmits the time synchronization service to the wireless device according to any of the embodiments and examples described herein.

Wireless device 1500 is operable to carry out the example method described with reference to FIG. 6 and possibly any other processes or methods disclosed herein. It is also to be understood that the method of FIG. 6 is not necessarily carried out solely by wireless device 1500. At least some operations of the method can be performed by one or more other entities, including virtual apparatuses.

Wireless device 1500 may comprise processing circuitry, such as 120 of FIG. 5. In some implementations, the processing circuitry may be used to cause receiving module 1502, determining module 1504, transmitting module 1506, and any other suitable units of wireless device 1500 to perform corresponding functions according one or more embodiments of the present disclosure.

As illustrated in FIG. 8, wireless device 1500 includes receiving module 1502, determining module 1504, and transmitting module 1506. In certain embodiments, receiving module 1502 receives a time synchronization service provided to a wireless device and receives indications from the network node, all according to any of the embodiments and examples described above. Determining module 1604 obtains a desired timing accuracy threshold for a time synchronization service and may determine a timing accuracy error of the wireless device, all according to any of the embodiments and examples described herein. Transmitting module 1606 may transmit the timing accuracy threshold and timing accuracy error of the wireless device to a network node according to any of the embodiments and examples described herein.

Figure 9:
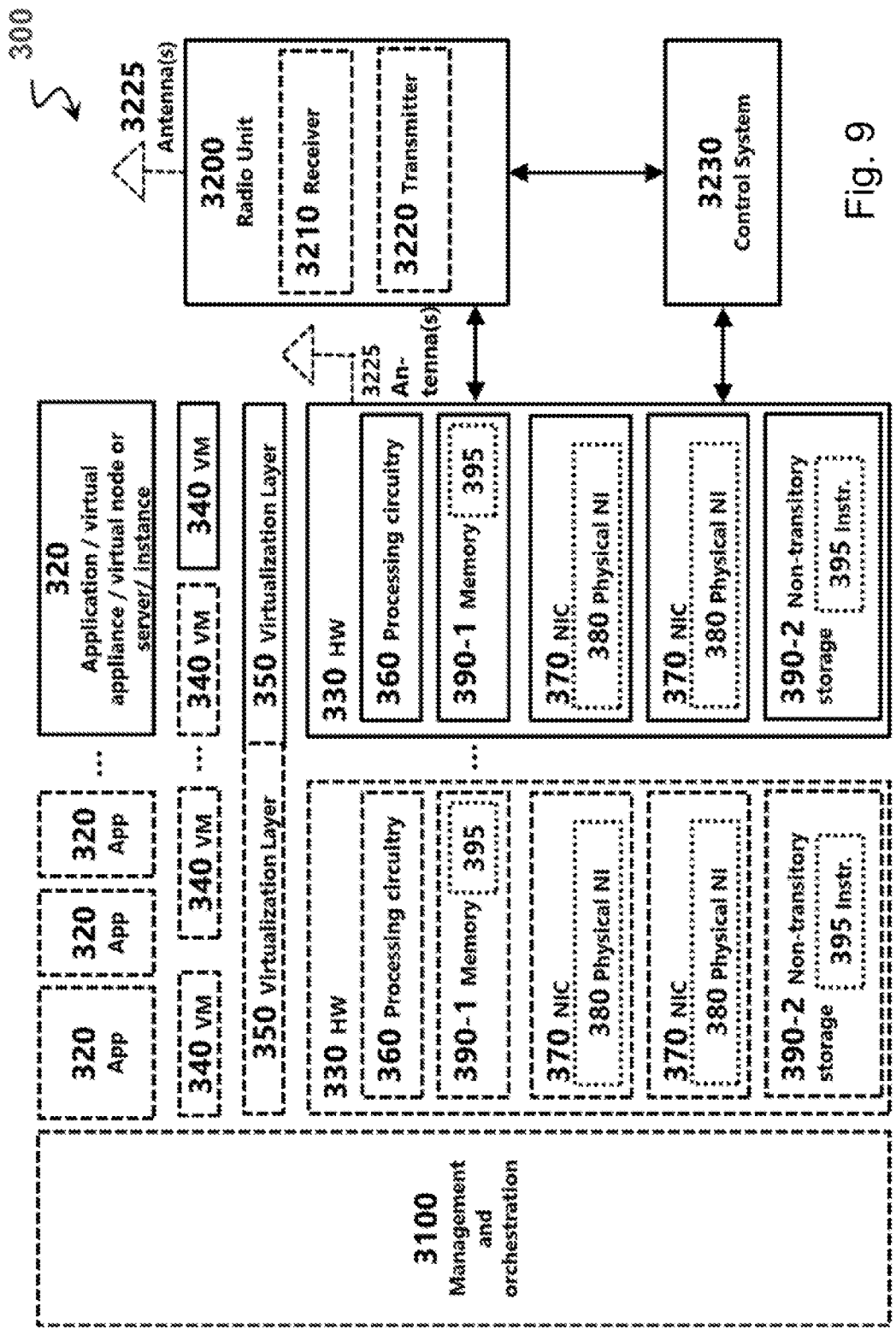
FIG. 9 illustrates an example virtualization environment, according to certain embodiments.

FIG. 9 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein, such as the methods of FIGS. 6 and 7, may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 9, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 9.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Generally, all terms used herein are to be interpreted according to their ordinary meaning in the relevant technical field, unless a different meaning is clearly given and/or is implied from the context in which it is used. All references to a/an/the element, apparatus, component, means, step, etc.

are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

The invention claimed is:

1. A method for use in a network node for delivering a time synchronization service, the method comprising:
   obtaining a timing accuracy threshold for a time synchronization service provided to a wireless device;
   determining, based on a first timing accuracy error at the network node and a second timing accuracy error between the network node and the wireless device, that a timing accuracy of the time synchronization service is equal or superior to the timing accuracy threshold;
   in response to determining that the timing accuracy of the time synchronization service is equal or superior to the timing accuracy threshold, transmitting the time synchronization service to the wireless device with a timing accuracy equal or superior to the timing accuracy threshold;
   determining, based on the first timing accuracy error at the network node and the second timing accuracy error between the network node and the wireless device, that the timing accuracy of the time synchronization service is inferior to the timing accuracy threshold; and
   in response to determining that the timing accuracy of the time synchronization service is inferior to the timing accuracy threshold, reconfiguring the network node to improve the timing accuracy of the time synchronization service.

2. The method of claim 1, wherein reconfiguring the network node comprises configuring the network node to use beamforming towards the wireless device.

3. The method of claim 1, wherein reconfiguring the network node comprises configuring the network node to increase the power for transmission to the wireless device.

4. A network node operable to deliver a time synchronization service, the network node comprising processing circuitry operable to:
   obtain a timing accuracy threshold for a time synchronization service provided to a wireless device;
   determine, based on a first timing accuracy error at the network node and a second timing accuracy error between the network node and the wireless device, that a timing accuracy of the time synchronization service is equal or superior to the timing accuracy threshold;
   in response to determining that the timing accuracy of the time synchronization service is equal or superior to the timing accuracy threshold, transmit the time synchronization service to the wireless device with a timing accuracy equal or superior to the timing accuracy threshold;
   determine, based on the first timing accuracy error at the network node and the second timing accuracy error between the network node and the wireless device, that the timing accuracy of the time synchronization service is inferior to the timing accuracy threshold; and
   in response to determining that the timing accuracy of the time synchronization service is inferior to the timing accuracy threshold, reconfigure the network node to improve the timing accuracy of the time synchronization service.

5. The network node of claim 4, wherein the processing circuitry is operable to reconfigure the network node by configuring the network node to use beamforming towards the wireless device.

6. The network node of claim 4, wherein the processing circuitry is operable to reconfigure the network node by configuring the network node to increase the power for transmission to the wireless device.

7. The network node of claim 4, wherein the processing circuitry is operable to reconfigure the network node by configuring the network node to increase the bandwidth for transmission to the wireless device.

8. The network node of claim 4, wherein the processing circuitry is operable to reconfigure the network node by configuring the network node to send a timing advance (TA) value to the wireless device that is more accurate than a TA value previously used with the wireless device.

9. The network node of claim 4, wherein the processing circuitry is operable to reconfigure the network node by configuring the network node to estimate a round trip time (RTT) of a transmission with the wireless device based on a reference signal transmitted from the network node to the wireless device and from the wireless device to the network node.

10. The network node of claim 4, wherein the processing circuitry is operable to reconfigure the network node by configuring the network node to increase the periodicity of reference signals transmitted to the wireless device.

11. The network node of claim 4, wherein reconfiguring the network node comprises configuring the network node to reduce interference from communication with other wireless devices.

12. The network node of claim 4, the processing circuitry further operable to:
   in response to determining that the timing accuracy of the time synchronization service is equal or superior to the timing accuracy threshold, reconfigure the network node to conserve network resources while providing the time synchronization service to the wireless device with the timing accuracy equal or superior to the timing accuracy threshold.

13. The network node of claim 12, wherein the processing circuitry is operable to reconfigure the network node by one or more of:
configuring the network node not to use beamforming towards the wireless device;
configuring the network node to decrease the power for transmission to the wireless device;
configuring the network node to decrease the bandwidth for transmission to the wireless device;
configuring the network node to send a timing advance (TA) value to the wireless device with lower resolutions than a TA value previously used with the wireless device;
configuring the network node to decrease the periodicity of reference signals transmitted to the wireless device; and
configuring the network node to increase communications with other wireless devices.

14. The network node of claim 4, the processing circuitry further operable to receive a timing accuracy error of the wireless device in receiving the time synchronization service, and wherein the processing circuitry is operable to determine that the timing accuracy of the time synchronization service is equal or superior to the timing accuracy threshold further based on the timing accuracy error of the wireless device.

15. The network node of claim 4, wherein the timing accuracy threshold includes timing traceability information and timing precision information for the time synchronization service.

16. The network node of claim 4, wherein the processing circuitry is operable to obtain the timing accuracy threshold by obtaining subscription information associated with the wireless device.

17. The network node of claim 4, wherein the processing circuitry is operable to obtain the timing accuracy threshold by receiving signaling from the wireless device.

18. The network node of claim 4, wherein the processing circuitry is operable to obtain the timing accuracy threshold by receiving signaling from a core network.

19. The network node of claim 4, the processing circuitry further operable to signal the timing accuracy threshold to another network node.

* * * * *